United States Patent [19]
Huang et al.

[11] Patent Number: 6,126,838
[45] Date of Patent: Oct. 3, 2000

[54] METHOD OF WASTEWATER TREATMENT BY ELECTROLYSIS AND OXIDIZATION

[75] Inventors: Yao-Hui Huang; Gaw-Hao Huang; Shen-Nan Lee; Shih-Ming Lin, all of Hsinchu, Taiwan

[73] Assignee: Industrial Technology Research Institute, Hsinchu, Taiwan

[21] Appl. No.: 09/106,275

[22] Filed: Jun. 29, 1998

[30] Foreign Application Priority Data

May 1, 1998 [TW] Taiwan ................................. 87106788

[51] Int. Cl.[7] .................................................... C02F 1/463
[52] U.S. Cl. .......................... 210/712; 205/753; 205/755; 210/715; 210/717; 210/721; 210/724; 210/727; 210/748; 210/912
[58] Field of Search ..................................... 205/753, 755, 205/756; 210/712, 713, 714, 715, 716, 717, 721, 722, 724, 725, 726, 727, 748, 912, 759

[56] References Cited

U.S. PATENT DOCUMENTS

| | | | |
|---|---|---|---|
| 1,505,104 | 8/1924 | Moerk | 205/753 |
| 3,350,302 | 10/1967 | Demeter et al. | 210/714 |
| 4,094,755 | 6/1978 | Moeglich | 204/149 |
| 4,224,148 | 9/1980 | Lindman et al. | 210/714 |
| 4,802,991 | 2/1989 | Miller | 210/705 |
| 4,927,543 | 5/1990 | Bablon et al. | 210/711 |
| 4,997,573 | 3/1991 | Browne | 210/714 |
| 5,531,865 | 7/1996 | Cole | 205/751 |
| 5,538,636 | 7/1996 | Gnann et al. | 210/631 |
| 5,635,073 | 6/1997 | Aktor et al. | 210/714 |
| 5,741,426 | 4/1998 | McCabe et al. | 210/707 |
| 5,770,091 | 6/1998 | Binot et al. | 210/711 |
| 5,800,717 | 9/1998 | Ramsay et al. | 210/711 |

*Primary Examiner*—Peter A. Hruskoci
*Attorney, Agent, or Firm*—Sughrue, Mion, Zinn, Macpeak & Seas, PLLC

[57] ABSTRACT

Disclosed is a method for treating highly concentrated wastewater by electrolysis and oxidization, said method being characterized in that the electrolysis and oxidization are carried out in a fluidized bed of a suitable particulate carrier. The electrolytic reduction efficiency of ferric ions is improved by the fluidized particulate carrier, and thus a high proportion of iron(III) to iron(II) can be sustained in the system. This invention allows extensive purification of wastewater with improved efficiency.

13 Claims, 2 Drawing Sheets

METHOD OF WASTEWATER TREATMENT BY ELECTROLYSIS AND OXIDIZATION

BACKGROUND OF THE INVENTION

1. Field of the Invention

The present invention relates to a method for removing chemical oxygen demand (COD) from wastewater by electrolysis and oxidization. More particularly, it relates to a method utilizing a fluidized bed to facilitate the electrolytic reduction of ferric ions so as to sustain a high COD removal efficiency. The method described herein is particularly suitable for purification of highly concentrated wastewater.

2. Description of the Related Arts

To meet strict laws on environmental protection, the COD in effluent wastewater from factories must be reduced to a significant extent. A feasible method, known as Fenton's method, has been widely used for the reduction of COD in wastewater. According to Fenton's method, hydrogen peroxide and iron(II) compounds are added to wastewater so that the organic pollutants contained in wastewater are oxidized by the hydroxyl free radicals (OH) produced by the reaction of the hydrogen peroxide and the ferrous ion. However, in practical applications, Fenton's method is not completely satisfactory. The disadvantages thereof are summarized as below:

1. The necessity of addition of chemical reagents such as hydrogen peroxide, ferrous ions, acids and alkalis makes the practice of this method costly.
2. A significant amount of iron(III) hydroxide sludge is produced. The iron sludge needs to be further treated. However, such treatment is also costly and may further pollute the environment.

Several modifications of Fenton's method have been proposed to solve the above-mentioned problems. For example, Gregor et al (EP 92/02357) discloses a process to purify highly concentrated wastewater by chemical oxidation using Fenton's reagent (i.e. hydrogen peroxide and iron(II) compounds). The process is characterized in that the iron(III) sludge is separated and then reduced electrolytically back into iron(II) compounds and in that the sludge so reduced is fed back into the process. Japanese Patent JP 62171732 discloses a method for treating organic matters in waste cleansing systems by Fenton's method, wherein the iron(III) is electrolytically reduced to iron(II) and then incorporated into the iron sludge for reuse.

The method as described in the last paragraph make the reuse of the iron sludge possible. However, such a method has a serious drawback, namely, a gradual decrease in reduction efficiency. In the electrolytic reduction, the concentration of iron(III) must be greater than 30,000 mg/L so as to reach a high efficiency and to provide sufficient iron(II) to carry out a Fenton's reaction. However, since the current efficiency at a cathode gradually decreases with the consumption of iron(III), the COD removal efficiency as well as the reduction efficiency gradually decreases with time. In Gregor's modification, when two-thirds of the iron(III) is reduced to iron(II), the electrolytic reduction efficiency decreases to about 50%. Accordingly, it would be time-consuming and uneconomic to completely removal the COD in wastewater because the reaction time will be undesirably prolonged. According to Gregor's method, the electrolytic reduction is carried out at a pH of less than 1; while on the contrary, the oxidization is carried out at a pH greater than 3. This suggests a large quantity of acids and alkalis would be required to adjust the pH values.

A diagram of the current efficiency and the Fe(II) concentration as a function of the reaction time is shown in FIG. 1, in which a variety of cathodes are employed at the electrolysis. It points out in FIG. 1 that if the initial concentration of Fe(II) is 10,000 mg/L, it will take longer than 150 minutes to reduce two-thirds of the Fe(III) to Fe(II), whereas the current efficiency has diminished to less than 20%.

SUMMARY OF THE INVENTION

Accordingly, it is an object of the invention to provide a method for the removal of COD from wastewater which can significantly reduce the operational costs not only by recycling the iron sludge but also by improving the reduction efficiency.

In order to achieve this, the present invention is characterized in that the electrolysis and oxidization are carried out in a fluidized bed of a suitable particulate carrier, thereby improving the mass transfer rate of iron(III) at the cathode. Furthermore, according to another feature of the invention, hydrogen peroxide is continuously added to the reaction vessel, so that the produced iron(II) will be subjected to Fenton's reaction as soon as it is reduced from iron(III). In such a manner, a high proportion of iron(III) to iron(II) in the system will be sustained and therefore the electrolytic reduction efficiency of iron(III) is improved. The prior art method requires a high iron(III) concentration of 30,000 mg/L and a low pH of less than 1 to obtain a sufficiently high current efficiency. In comparison, this invention can achieve a high current efficiency of above 70% even at a low iron(III) concentration of 1,000 mg/L and at a relatively high pH of 2. This suggests the COD of wastewater is more efficiently removed through the process of the invention and also suggests this invention is economically advantageous.

A diagram of the current efficiency as a function of the reaction time is shown in FIG. 2, in which a fluidized-bed reduction and an non-fluidized-bed reduction are compared. With attention to FIG. 2, the initial concentration of Fe(III) was 900 mg/L and the quantity of the carrier employed (glass beads) was 400 g/L. The current efficiency was significantly improved by the fluidized bed of glass beads.

This invention for treating wastewater includes the steps of: (a) feeding the wastewater, iron compounds, and a particulate carrier to an electrolyzing/oxidizing reactor; (b) controlling the pH of the wastewater to less than 2.5, preferably within the range between 1.5 to 2.5, and initiating a fluidized bed of the particulate carrier; (c) electrolyzing and oxidizing the wastewater while continuously adding hydrogen peroxide to the reactor; and (d) adjusting the pH of the wastewater to 6–9 before adding a flocculating agent and removing the treated wastewater as effluent from the reactor.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which.

DETAILED DESCRIPTION OF THE INVENTION

Figure 1:
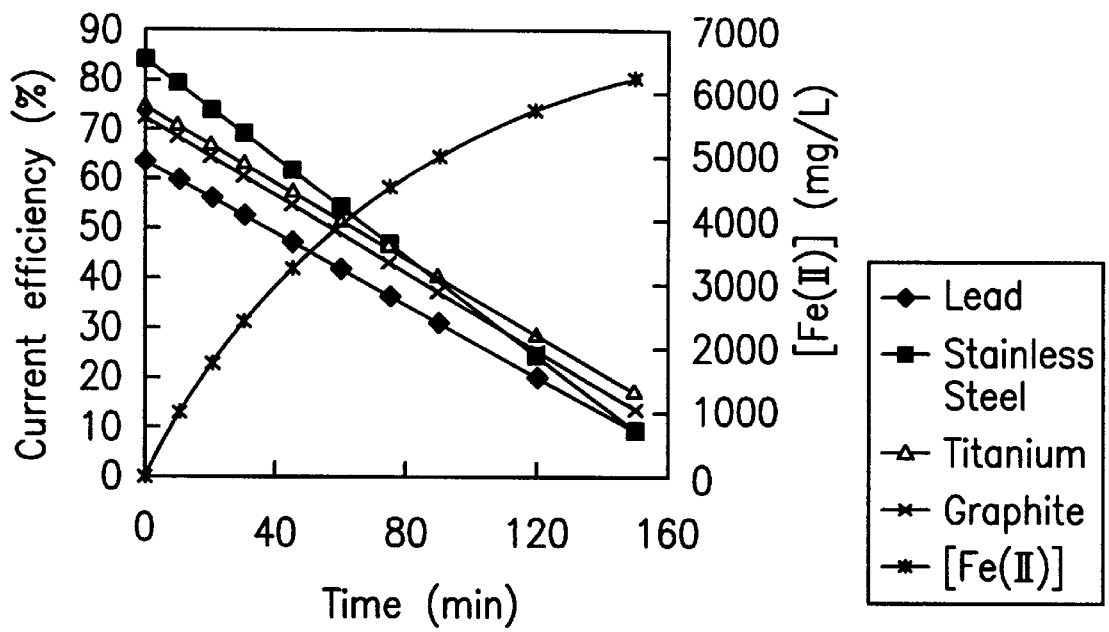
FIG. 1 is a diagram of the current efficiency and the Fe(II) concentration as a function of the reaction time.
Figure 2:
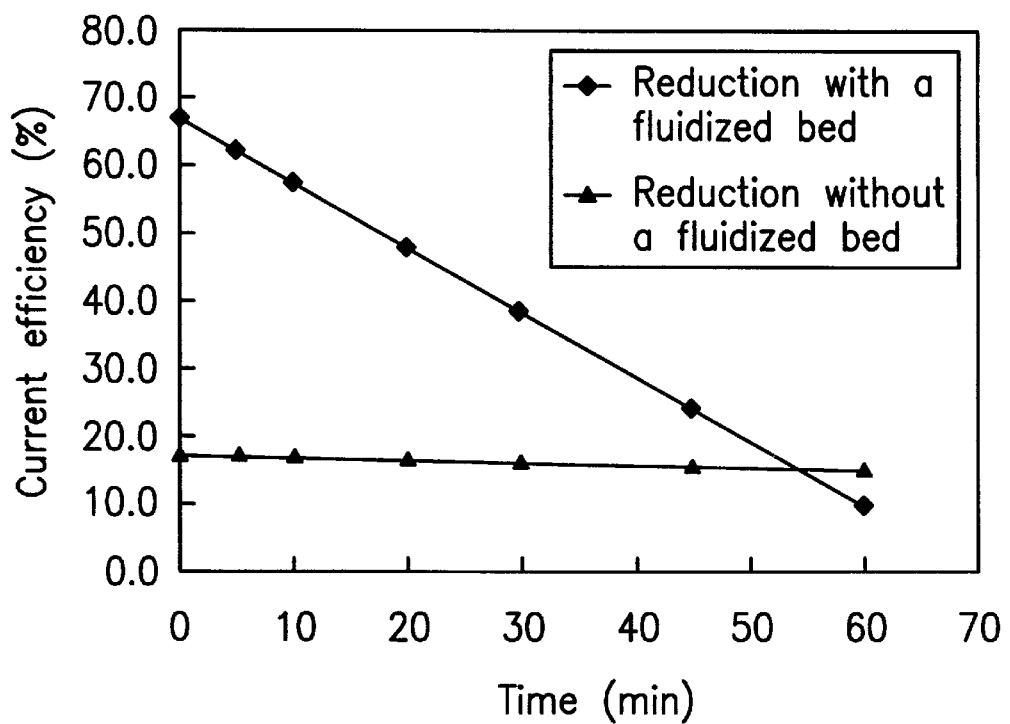
FIG. 2 is a diagram of the current efficiency as a function of the reaction time, in which a fluidized-bed reduction and an non-fluidized-bed reduction are compared.
Figure 3:
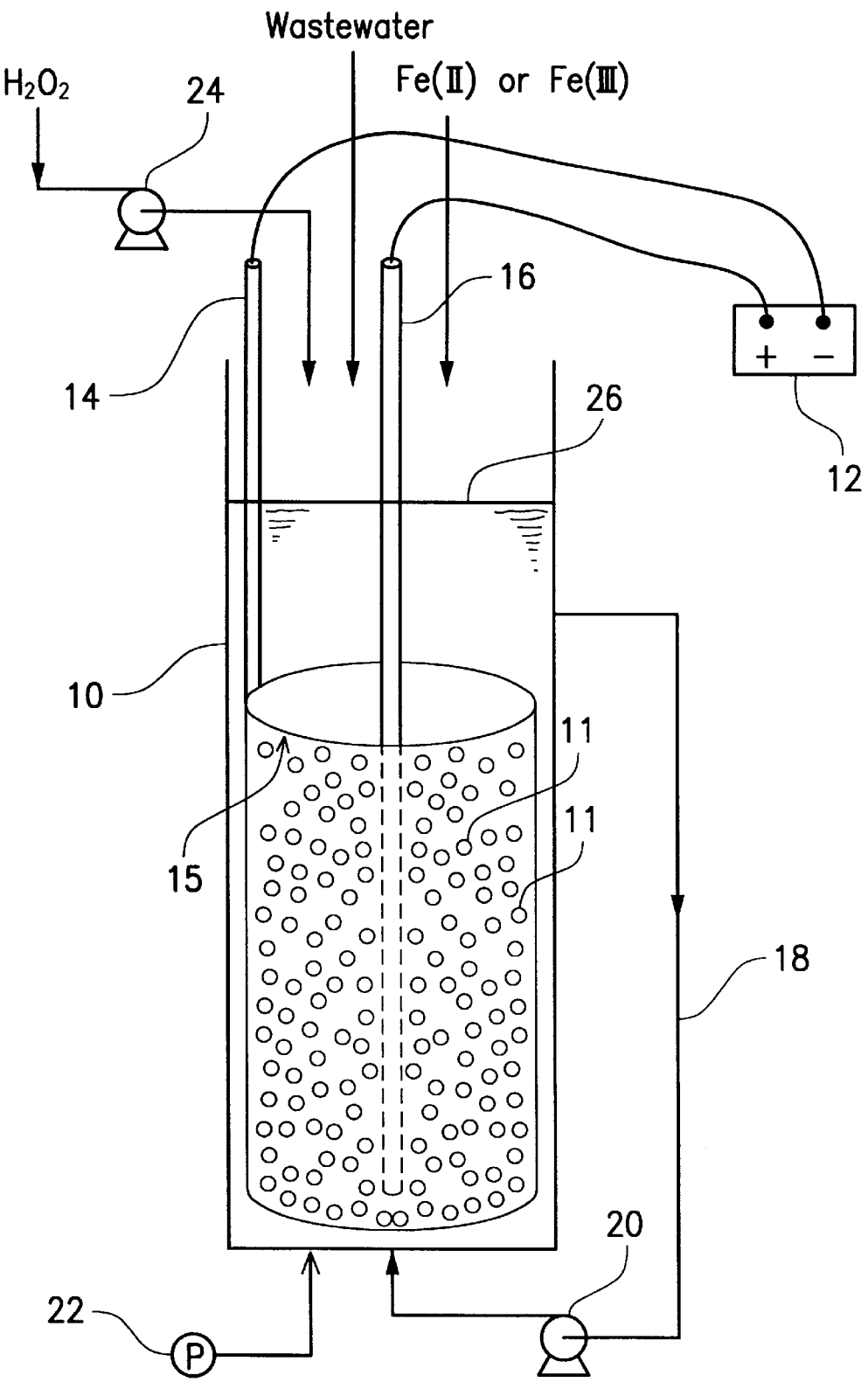
FIG. 3 is a schematic representation of an embodiment of apparatus used to carry out the invention.

Referring to FIG. 3, there is shown a preferred embodiment of apparatus for performing the method of the invention. According to this invention, the wastewater is treated batchwisely in an electrolyzing/oxidizing vessel 10 that has an anode and a cathode to which sufficient and stable direct current is applied from a power supply 12. The anode, for example, can be a dimensionally stable anode (DSA) cylinder 16, and the cathode can be composed of a cathode rod 14 and a sustained steel cathode cylinder 15 which are electrically connected. At the outset, wastewater 26, iron compounds, and a suitable particulate carrier 11 are fed to the electrolyzing/oxidizing vessel 10. In general, the iron compounds are dissolved in an aqueous solution when they are added. The iron compounds as used herein can be iron(II) compounds or iron(III) compounds, and preferably present in an amount of 500–5000 mg/per liter of wastewater. Exemplary iron compounds include ferric sulfate, ferric chloride, ferrous sulfate, and ferrous chloride. Particulate carriers suitable for use in this invention include but are not limited to brick grains, sand, glass beads, synthetic resins, pumic, and artificial pellets.

Still referring to FIG. 3, the particulate carrier 11 is then fluidized by recirculating the wastewater 26 in the vessel 10 through a recycling conduit 18 by means of a recirculation pump 20. The recirculation is created and maintained by introducing the wastewater into the reactor with a superficial velocity of about 10–150 m/hr. Preferably, the fluidized carrier 11 shall cover the entire surface of the cathode cylinder 15. An alternative way to fluidize the particulate carrier and to thoroughly mix the wastewater with reactants is to use an air pump 22. Thereafter, the pH of the wastewater is adjusted to less than 2.5 using an acid, for example sulfuric acid. It is to be noted that if the original pH value is already smaller than 2.5, no pH adjustment herein is required.

Subsequently, hydrogen peroxide is continuously added to the reaction vessel 10 by using a pump 24, and the oxidation of wastewater and electrolysis are carried out in the fluidized bed of the particulate carrier. The electrolysis is preferably conducted at a cathodic current density of about 20–500 A/m$^2$. The quantity of hydrogen peroxide added into the reaction vessel is appropriately selected as a function of the COD of the wastewater. Preferably, the molar ratio of hydrogen peroxide to COD is within the range from 0.3 to 1.2. As previously indicated, the mass transfer rate at the cathode 15 is increased by the fluidized particulate carrier 11, and a high proportion of iron(III) to iron(II) is sustained by continuous addition of hydrogen peroxide. As a consequence, the current efficiency of electrolytic reduction is steadily sustained at above 70% during the reaction.

When the reaction is completed, alkali is added into the vessel 10 to adjust the pH value to 6–9, and polymers are added thereto to flocculate the iron hydroxide particles into flocs. Then, the COD-reduced waste water is removed as effluent from the reaction vessel to thereby complete the treatment. According to this invention, the electrolytic reduction can be performed at a current efficiency of above 70% as long as the concentration of iron(III) is greater than 1,000 mg/L. Furthermore, this method is particularly suited for treating high-COD-concentrated wastewater, where a COD removal of 85–98% or even higher can be achieved.

The method for treating wastewater according to this invention can be applied in various fields as follows:

1. removal of copper or nickel ions in wastewater, for example, wastewater from electroplating, printed circuit board manufacturing, and metal finishing;
2. treatment of the high-COD-concentrated wastewater, for example, wastewater from chemical engineering factories, synthetic fiber factories, and paper-making factories; or
3. purification of laboratory wastewater.

EXAMPLES

Comparative Example 1

The electroless nickel plating wastewater from a metal finishing factory was treated by an apparatus as depicted in FIG. 3 where no current was supplied for electrolysis. In the reaction vessel, the wastewater was treated with an iron solution having a total concentration of 5,000 mg/L, and hydrogen peroxide was quantitatively added thereto at a rate of 32.5 g/hr. After four hours of the treatment, the COD in the wastewater not only did not decrease, it actually increased due to the un-reacted hydrogen peroxide.

The following quantities and equipment were used in the above described process:

Anode: titanium DSA rod

Cathode: sustained steel pipe

Vessel size: 10.5 cm×10.5 cm×120 cm

Volume of wastewater: 2.5 L

Total iron concentration: 5,000 mg/L

Mixing: recycling wastewater by a recirculation pump

Flow of $H_2O_2$: 1.427 mL/min ($H_2O_2$ concentration: 380 g/L)

The data for the wastewater and the data obtained following the above described treatment are as follows:

| Reaction time (hr) | 0.0 | 1.0 | 2.0 | 3.0 | 4.0 |
|---|---|---|---|---|---|
| Temperature (° C.) | 22.7 | 36.1 | 33.2 | 31.2 | 30.4 |
| pH value | 1.58 | 1.23 | 1.24 | 1.21 | 1.20 |
| Current (A) | — | — | — | — | — |
| Voltage (V) | — | — | — | — | — |
| Dissolved oxygen (mg/L) | 0.4 | 27.2 | 27.1 | 29.0 | 30.4 |
| Conductivity (ms/cm) | 52.6 | 46.4 | 46.6 | 46.2 | 45.3 |
| $H_2O_2$ (g) | 0.00 | 32.5 | 65.1 | 97.6 | 130.2 |
| COD (mg/L) | 29080 | 26180 | 28730 | 35770 | 32490 |
| COD removal percentage (%) | — | 10.0 | 1.2 | −23.0 | −11.7 |
| $H_2O_2$ utilization efficiency (%) | — | 48.5 | 2.9 | −37.3 | −14.3 |

Example 1

The same procedure as in the Comparative Example 1 was repeated except that a direct current was supplied for electrolysis. After four hours of the treatment, a 86.3% removal of COD was achieved. We attribute this better efficiency to the fluidized-bed electrolysis and to the continuous addition of hydrogen peroxide.

The following quantities and equipment were used in the above described process:

Anode: titanium DSA rod

Cathode: sustained steel pipe

Vessel size: 10.5 cm×10.5 cm×120 cm

Volume of wastewater: 2.5 L

Total iron concentration: 5,000 mg/L

Mixing: recycling wastewater by a recirculation pump

Flow of $H_2O_2$: 1.427 mL/min ($H_2O_2$ concentration: 380 g/L)

Power supply: constant current mode 7.8 A

Current densities: cathode 166 A/m$^2$; anode 1245 A/m$^2$

The data for the wastewater and the data obtained following the treatment according to this invention are as follows:

| Reaction time (hr) | 0.0 | 1.0 | 2.0 | 3.0 | 4.0 |
|---|---|---|---|---|---|
| Temperature (° C.) | 24.0 | 48.3 | 56.8 | 61.6 | 57.9 |
| pH value | 2.30 | 2.08 | 2.09 | 2.11 | 2.14 |
| Current (A) | 7.8 | 7.8 | 7.8 | 7.9 | 7.9 |
| Voltage (V) | 5.0 | 4.3 | 4.2 | 4.1 | 4.3 |
| Dissolved oxygen (mg/L) | 0.2 | 3.6 | 0.9 | 0.8 | 12.6 |
| Conductivity (ms/cm) | 43.0 | 36.6 | 36.5 | 35.8 | 34.6 |
| $H_2O_2$ (g) | 0.0 | 32.5 | 65.1 | 97.6 | 130.2 |
| COD (mg/L) | 28030 | 21170 | 16340 | 9466 | 3824 |
| COD removal percentage (%) | — | 22.3 | 41.7 | 66.2 | 86.3 |
| $H_2O_2$ utilization efficiency (%) | — | 104.8 | 97.8 | 103.6 | 101.2 |

Example 2 & Comparative Example 2

In these two examples, the rinsing water from the manufacture of printed circuit boards was treated by an apparatus as depicted in FIG. 3, where the direct current was only supplied in the treatment of Example 2. In the reaction vessel, the wastewater was treated with an iron solution having a total concentration of 5,000 mg/L, and hydrogen peroxide was quantitatively added thereto. After 11 hours of treatment, in Example 2 the COD concentration in the wastewater was reduced to 729, which corresponds with a 98% removal, whereas in Comparative Example 2 the COD concentrated was reduced to 4285, which corresponds with a mere 89% removal.

The following quantities and equipment were used in the above described process:

Anode: titanium DSA rod

Cathode: sustained steel pipe

Vessel size: 10.5 cm×10.5 cm×120 cm

Volume of wastewater: 4 L

Total iron concentration: 1,000 mg/L

Mixing: recycling wastewater by a recirculation pump

Flow of $H_2O_2$: 1.47 mL/min ($H_2O_2$ concentration: 418 g/L)

Power supply(only in Example 2): constant current mode 10.3 A

Current densities(only in Example 2): cathode 100 A/m²; anode 797 A/m²

The data for the wastewater and the data obtained following the above described treatment are as follows:

| Example 2: | | | | | |
|---|---|---|---|---|---|
| Reaction time (hr) | 0.0 | 5.0 | 7.0 | 8.0 | 11.0 |
| Temperature (° C.) | 22.6 | 63.0 | 62.4 | 63.2 | 61.2 |
| pH value | 1.96 | 1.51 | 1.13 | 1.0 | 0.9 |
| Current (A) | 10.3 | 10.3 | 10.3 | 10.3 | 10.3 |
| Voltage (V) | 8.6 | 5.1 | 5.3 | 5.3 | 4.7 |
| ORP* (mV) | 552 | 407 | 340 | 326 | 457 |
| Dissolved oxygen (mg/L) | 10.1 | 5.7 | 4.0 | 4.5 | 10.2 |
| $H_2O_2$ (g) | 0 | 231.2 | 323.6 | 369.8 | 508.5 |
| COD (mg/L) | 40870 | 20530 | 14670 | 11150 | 729 |
| COD removal percentage (%) | — | 49.77 | 64.11 | 72.72 | 98.22 |
| $H_2O_2$ utilization efficiency (%) | — | 93.5 | 86.0 | 85.4 | 83.9 |

*ORP: Oxidization Reduction Potential

Example 3 & Comparative Example 3

In these two examples, highly concentrated wastewater from a chemical engineering factory was treated by an apparatus as depicted in FIG. 3 where the direct current was only supplied in the treatment of Example 3. In Comparative Example 3, a total iron concentration of 5,000 mg/L was employed, while in Example 3 a lower concentration of 1,000 mg/L was employed. After six hours of treatment, in Example 3 the COD concentration in the wastewater was reduced to 271 mg/L, which corresponds with a 98% removal, whereas in Comparative Example 3 only 68% of the COD was removed.

The following quantities and equipment were used in the above described process:

Anode: titanium DSA rod

Cathode: sustained steel pipe

Vessel size: 10.5 cm×10.5 cm×120 cm

Volume of wastewater: 4 L

Total iron concentration: 1,000 mg/L (Example 3); 5,000 mg/L (Comparative Example 3)

Mixing: recycling wastewater by a recirculation pump

Flow of $H_2O_2$: 1.53 mL/min ($H_2O_2$ concentration: 418 g/L)

Power supply(only in Example 3): constant current mode 10.3 A

Current densities(only in Example 3): cathode 100 A/m²; anode 797 A/m²

The data for the wastewater and the data obtained following the above described treatment are as follows:

| Comparative Example 2: | | | | | |
|---|---|---|---|---|---|
| Reaction time (hr) | 0.0 | 5.0 | 7.0 | 8.0 | 11.0 |
| Temperature (° C.) | 21.4 | 54.6 | 50.2 | 48.6 | 47.0 |
| pH value | 1.96 | 1.48 | 1.47 | 1.50 | 1.54 |
| Current (A) | — | — | — | — | — |
| Voltage (V) | — | — | — | — | — |
| ORP* (mV) | 361 | 591 | 585 | 588 | 605 |
| Dissolved oxygen (mg/L) | 9.6 | 14.7 | 12.5 | 11.0 | 11.8 |
| $H_2O_2$ (g) | 0 | 184.9 | 258.9 | 322.9 | 406.8 |
| COD (mg/L) | 41590 | 19840 | 14240 | 8972 | 4285 |
| COD removal percentage (%) | — | 49.9 | 64.1 | 77.4 | 89.2 |
| $H_2O_2$ utilization efficiency (%) | — | 91.0 | 83.4 | 78.3 | 73.8 |

*ORP: Oxidization Reduction Potential

| Comparative Example 3: | | | | | |
|---|---|---|---|---|---|
| Reaction time (hr) | 0.0 | 1.0 | 3.0 | 5.0 | 6.0 |
| Temperature (° C.) | 23.3 | 29.8 | 45.3 | 50.9 | 47.9 |
| pH value | 2.46 | 2.69 | 2.54 | 2.81 | 3.13 |
| Current (A) | — | — | — | — | — |
| Voltage (V) | — | — | — | — | — |
| ORP* (mV) | 366 | 603 | 588 | 540 | 505 |
| Conductivity (ms/cm) | 26.6 | 21.9 | 25.5 | 29.2 | 29.5 |
| $H_2O_2$ (g) | 0.0 | 38.4 | 115.1 | 191.9 | 230.2 |
| COD (mg/L) | 17410 | 15860 | 10360 | 5843 | 5536 |
| COD removal percentage (%) | — | 8.9 | 40.5 | 66.4 | 68.2 |
| $H_2O_2$ utilization efficiency (%) | — | 42.9 | 65.1 | 64.1 | 54.8 |

*ORP: Oxidization Reduction Potential

| Example 3: | | | | | |
|---|---|---|---|---|---|
| Reaction time (hr) | 0.0 | 1.0 | 3.0 | 5.0 | 6.0 |
| Temperature (° C.) | 22.8 | 41.2 | 58.2 | 61.6 | 57.7 |
| pH value | 1.99 | 2.23 | 2.02 | 2.02 | 2.36 |
| Current (A) | 10.3 | 10.3 | 10.3 | 10.3 | 10.3 |
| Voltage (V) | 6.8 | 5.7 | 4.6 | 4.0 | 4.3 |
| ORP* (mV) | 569 | 577 | 450 | 514 | 596 |
| Conductivity (ms/cm) | 20.5 | 19.5 | 25.0 | 27.6 | 28.2 |
| $H_2O_2$ (g) | 0.0 | 38.4 | 115.1 | 191.9 | 230.2 |
| COD (mg/L) | 17940 | 14770 | 7827 | 1255 | 271 |
| COD removal percentage (%) | — | 15.2 | 55.0 | 77.4 | 98.4 |
| $H_2O_2$ utilization efficiency (%) | — | 73.1 | 88.4 | 89.5 | 79.1 |

*ORP: Oxidization Reduction Potential

Example 4

The electroless nickel plating wastewater from a metal finishing factory was treated by an apparatus as depicted in FIG. 3. The raw wastewater has a nickel concentration of 2,081 mg/L and a COD concentration of 13,690 mg/L. In the reaction vessel, the wastewater was treated for 16 hours at a pH of 2 with an iron solution having a total concentration of 1,000 mg/L. Thereafter, the pH value of the wastewater was adjusted to 8.8 by adding calcium hydroxide, followed by addition of polymers to flocculate and precipitate the iron hydroxide particles. Herein the nickel concentration in the clarified wastewater was reduced to 0.30 mg/L, which corresponds with a 99.9% removal, and the COD concentration was reduced to 696, which corresponds with a 95% removal.

The following quantities and equipment were used in the above described process:

Anode: titanium DSA rod

Cathode: sustained steel pipe

Vessel size: 10.5 cm×0.5 cm×120 cm

Volume of wastewater: 5 L

Total iron concentration: 1,000 mg/L

Mixing: recycling wastewater by a recirculation pump

Flow of $H_2O_2$: 1.07 mL/min ($H_2O_2$ concentration: 380 g/L)

Power supply: constant current mode 11.7 A

Current densities: cathode 62 A/m$^2$; anode 490 A/m$^2$

The data for the wastewater and the data obtained following the treatment according to this invention are as follows:

| Example 4: | | | | | |
|---|---|---|---|---|---|
| Reaction time (hr) | 0.0 | 2.0 | 5.0 | 13.8 | 16.0 |
| Temperature (° C.) | 28.2 | 35.3 | 39.3 | 38.5 | 28.0 |
| pH value | 2.00 | 2.00 | 1.68 | 1.88 | 8.80 |
| Current (A) | 7.8 | 7.8 | 7.8 | 7.8 | 7.8 |
| Voltage (V) | 4.2 | 4.2 | 4.3 | 4.3 | 4.3 |
| Dissolved oxygen (mg/L) | 5.6 | 7.2 | 2.0 | 10.2 | 6.0 |
| Ni concentration (mg/L) | 2081.0 | 2065.0 | 2029.0 | 656.0 | 0.3 |
| $H_2O_2$ (g) | 0.0 | 48.8 | 122.0 | 335.6 | 390.5 |
| COD (mg/L) | 13690 | 12390 | 9369 | 1346 | 696 |
| COD removal percentage (%) | — | 9.5 | 31.6 | 90.2 | 94.9 |
| $H_2O_2$ utilization efficiency (%) | — | 56.6 | 75.2 | 78.2 | 70.7 |

Example 5

The high-COD-concentrated wastewater from a chemical engineering factory was treated by an apparatus as depicted in FIG. 3 at a pH of 2. The wastewater was treated batchwisely five times. The iron solution was added only at the outset, while the succeeding treatments were performed by reusing the precipitated iron sludge to thereby reduce the sludge production. The iron sludge produced by the previous treatment was mixed with a new portion of raw wastewater, and the pH of the wastewater was adjusted back to pH 2 by adding acids before the next treatment proceeded.

The data for the wastewater and the data obtained following the treatment according to this invention are as follows:

| Times of treatment | 1 | 2 | 3 | 4 | 5 |
|---|---|---|---|---|---|
| Flow of $H_2O_2$ (mL/min) | 0.84 | 1.8 | 2.7 | 2.7 | 2.7 |
| $H_2O_2$ concentration (g/L) | 100 | 100 | 100 | 100 | 100 |
| Initial pH value | 2 | 2 | 2 | 2 | 2 |
| Volume of wastewater (L) | 2 | 2 | 2 | 2 | 2 |
| Water remained by the last treatment (L) | — | 2.5 | 2.5 | 2.5 | 2.5 |
| Current (A) | 5 | 5 | 5 | 5 | 5 |
| Voltage (V) | 8.9 | 8.1 | 8.6 | 8.6 | 8.6 |
| Reaction time (hr) | 5 | 2.5 | 2.5 | 2.5 | 2.5 |
| Final pH value | 7.0 | 8.7 | 7.0 | 7.0 | 7.4 |
| Amount of 0.1% polymer added (mg/L) | 30 | 30 | 30 | 30 | 30 |
| COD of influent wastewater (mg/L) | 6100 | 6100 | 5573 | 5573 | 5573 |
| COD of treated wastewater (mg/L) | 971 | 745 | 424 | 422 | 395 |
| COD removal percentage (%) | 87.1 | 87.7 | 92.4 | 92.4 | 92.9 |

As can be seen from the above table, even though these treatments were carried out by using the recycled iron sludge, COD removal percentages ranging from 87% to 93% were achieved.

What is claimed is:

1. A method for treating wastewater containing chemical oxygen demand (COD) by electrolysis and oxidation, comprising the steps of:
    (a) feeding the wastewater, iron compounds, and a suitable particulate carrier to an electrolyzing/oxidizing reactor wherein said reactor comprises a dimensionally stable Ti anode (DSA) and a cathode;
    (b) controlling the pH of the wastewater to less than 2.5 and initiating a fluidized bed of said particulate carrier;
    (c) electrolyzing and oxidizing the wastewater while continuously adding hydrogen peroxide to said reactor to remove said COD; and
    (d) adjusting the pH of the wastewater to 6–9 and removing the thus-treated wastewater as effluent from said reactor.

2. The method for treating wastewater as claimed in claim 1, wherein said iron compounds are an iron (III) compound.

3. The method for treating wastewater as claimed in claim 2, wherein said iron (III) compound is fed in an amount of 500–5000 mg/per liter of wastewater.

4. The method for treating wastewater as claimed in claim 3, wherein said iron (III) compound is ferric sulfate or ferric chloride.

5. The method for treating wastewater as claimed in claim 1, wherein said iron compounds are an iron (II) compound.

6. The method for treating wastewater as claimed in claim 5, wherein said iron (II) compound is ferrous sulfate or ferrous chloride.

7. The method for treating wastewater as claimed in claim 1, wherein said particulate carrier is selected from the group consisting of brick grains, sand, glass beads, synthetic resins, pumic, and artificial pellets.

8. The method for treating wastewater as claimed in claim 1, wherein the particulate carrier is kept fluidized by continuously recirculating the wastewater through a recycling conduit connected with said reactor by means of a recirculation pump.

9. The method for treating wastewater as claimed in claim 8, wherein the recirculation is created and maintained by introducing the wastewater into said reactor with a superficial velocity of about 10–150 m/hr.

10. The method for treating wastewater as claimed in claim 1, wherein in step (b) the pH of the wastewater is controlled to a level from 1.5–2.5.

11. The method for treating wastewater as claimed in claim 1, wherein in step (c) a cathodic current density of about 20–500 $A/m^2$ is applied to said reactor.

12. The method for treating wastewater as claimed in claim 1, wherein the molar ratio of hydrogen peroxide to COD is within the range from 0.3 to 1.2.

13. The method for treating wastewater as claimed in claim 1, wherein in step (d) includes adding a flocculating agent to said reactor.

* * * * *